(12) United States Patent
Sadovsky et al.

(10) Patent No.: US 8,332,751 B2
(45) Date of Patent: Dec. 11, 2012

(54) REMOVAL OF REDUNDANT INFORMATION FROM ELECTRONIC DOCUMENTS

(75) Inventors: Vladimir Sadovsky, Bellevue, WA (US); Michael D. Stokes, Eagle, ID (US); Joseph D. Ternasky, Mountain View, CA (US); Hubert Van Hoof, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 840 days.

(21) Appl. No.: 11/559,567

(22) Filed: Nov. 14, 2006

(65) Prior Publication Data
US 2008/0115055 A1 May 15, 2008

(51) Int. Cl.
*G06F 17/00* (2006.01)

(52) U.S. Cl. ......... 715/254; 715/253; 715/255; 382/166

(58) Field of Classification Search .................. 345/629; 715/728, 209–210, 229, 234, 238, 253, 255, 715/273, 277, 254; 382/166
See application file for complete search history.

(56) References Cited

U.S. PATENT DOCUMENTS

| | | | |
|---|---|---|---|
| 6,377,262 B1 | 4/2002 | Hitchcock et al. | |
| 6,459,429 B1 | 10/2002 | Deering | |
| 6,802,058 B2 | 10/2004 | Banavar et al. | |
| 6,995,874 B1 * | 2/2006 | Cullen et al. | 358/3.26 |
| 7,027,072 B1 | 4/2006 | Sadowski | |
| 7,152,055 B2 * | 12/2006 | Loschky et al. | 707/2 |
| 7,243,163 B1 * | 7/2007 | Friend et al. | 709/248 |
| 7,574,699 B1 * | 8/2009 | Simmons et al. | 717/136 |
| 2002/0073157 A1 * | 6/2002 | Newman et al. | 709/206 |
| 2002/0161883 A1 * | 10/2002 | Matheny et al. | 709/224 |
| 2004/0075683 A1 * | 4/2004 | Savage | 345/741 |
| 2004/0172618 A1 | 9/2004 | Marvin | |
| 2004/0205595 A1 * | 10/2004 | DelGobbo et al. | 715/513 |
| 2004/0246502 A1 | 12/2004 | Jacobsen et al. | |
| 2005/0188310 A1 | 8/2005 | Dideriksen et al. | |
| 2005/0196049 A1 * | 9/2005 | Clark | 382/232 |
| 2005/0206653 A1 | 9/2005 | Beaumont | |
| 2005/0210389 A1 * | 9/2005 | Middelfart | 715/730 |
| 2005/0213142 A1 | 9/2005 | Clark et al. | |
| 2006/0059414 A1 * | 3/2006 | Cory et al. | 715/500 |
| 2006/0074736 A1 | 4/2006 | Shukla et al. | |
| 2006/0146353 A1 | 7/2006 | Yue et al. | |
| 2006/0170706 A1 | 8/2006 | Hoffman et al. | |
| 2007/0266107 A1 * | 11/2007 | Friend et al. | 709/206 |

FOREIGN PATENT DOCUMENTS
JP 2003323428 A * 11/2003

OTHER PUBLICATIONS

Adobe Corporation, "Adobe® Acrobat® 7.0 Professional" version 7.0.5 and associated Complete Help, Sep. 23, 2004.*
Nakano, Shari. "Adobe® Acrobat® 7 in a Snap". 2005, Sams Publishing. pp. 209-210.*
Steward, Sid. "PDF Hacks", 2004, O'Reilly Media, Inc., p. 154.*
JP 2003323428 A English Abstract.*

(Continued)

*Primary Examiner* — Thu Huynh
(74) *Attorney, Agent, or Firm* — Lee & Hayes, PLLC

(57) ABSTRACT

In accordance with certain aspects of the removal of redundant information from electronic documents, a package for an electronic document includes a plurality of parts. The package is accessed, and redundant information in one or more of the plurality of parts is identified. The identified redundant information is removed from the package.

19 Claims, 7 Drawing Sheets

OTHER PUBLICATIONS

The Microsoft Office Open XML Format: Preview for Developers; Jun. 2005; website: http://www.microsoft.com/office/preview; pp. 1-22.*

Nakano, Shari. "Adobe® Acrobat® 7 in a Snap". 2005, Sams Publishing. pp. 99, 149.*

Adobe Acrobat 7 Printing Guide, 2005, downloaded from http://partners.adobe.com/public/asn/en/print_resource_center/AC7_PrintingGuide.pdf on May 21, 2010, pp. 1-50.*

Blaxell, Zygo; Dupemerge, Mar. 4, 2003 (archived Nov. 22, 2003), accessed from http://web.archive.org/web/20031122191958/http://www.hungrycats.org/~zblaxell/dupemerge/dupemerge.html, pp. 1-5.*

Adobe Corporation "Adobe Acrobat 7.0 Professional System requirements" 2006, accessed from http://web.archive.org/web/20060110045810/www.adobe.com/products/acrobatpro/systemreqs.html, pp. 1-2.*

Bergh, et al., "A Run-time system Context-Aware Multi-Device User Interfaces", retrieved at <<http://research.edm.luc.ac.be/~kris/research/publications/hcii2003/HCII2003_Vandenbergh_luyten_LEA.pdf>>, LEA, pp. 5.

Gobel, et al., "Device Independent Representation of Web-based Dialogs and Contents", retrieved at <<http://www.rn.inf.tu-dresden.de/scripts_lsrn/veroeffent_print/YUFORIC2001.pdf>>, Dresden University of Techology, Dresden D-01062, Germany, pp. 8.

Trofin, et al., "A Self-Optimizing Container Design for Enterprise Java Beans Applications", retrieved on Aug. 8, 2006, at <<http://scholar.google.com/scholar?hl=en&lr=&q=cache:sZPypcPPcdQJ:www.eeng.dcu.ie/~trofinm/docs/WCOP.pdf+A+Self-Optimizing+Container+Design+for+Enterprise+Java+Beans+Applications>>, Dublin City University, pp. 1-10.

* cited by examiner

REMOVAL OF REDUNDANT INFORMATION FROM ELECTRONIC DOCUMENTS

BACKGROUND

As computer technology has advanced and computers have become increasingly commonplace, more and more documents are being maintained in electronic form rather than traditional paper hardcopy form. Given the large quantity of such electronic documents, and the large amount of information that can be maintained in them, the amount of storage space required to store the electronic documents as well as the amount of bandwidth required to transmit the electronic documents can become burdensome. Thus, it would be beneficial to have a way to reduce the size of electronic documents without compromising their integrity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with certain aspects of the removal of redundant information from electronic documents, a package for an electronic document includes a plurality of parts. The package is accessed, and redundant information in one or more of the plurality of parts is identified. The identified redundant information is removed from the package.

BRIEF DESCRIPTION OF THE DRAWINGS

The same numbers are used throughout the drawings to reference like features.

DETAILED DESCRIPTION

Removal of redundant information from electronic documents is described herein. Electronic documents refer to any of a variety of different types of documents (e.g., including characters, symbols, equations, images, and so forth) that are stored electronically rather than in rendered form (e.g., rather than in paper or other hard copy form, film, bitmap image, or any other physically rendered form). Electronic documents are maintained in a package including multiple parts. The various parts are separate but related to one another. Redundant information within the electronic document is identified, and one occurrence of the redundant information can be maintained while the other occurrence(s) of the redundant information can be replaced with a link to the maintained occurrence. Redundant information in the form of portions of images that are not displayed when the electronic document is displayed can also be removed from the electronic document. Furthermore, redundant information in the form of color profile meta data can be removed from the electronic document by using the color profile meta data to generate a version(s) of the image in one or more target color spaces.

Figure 1:
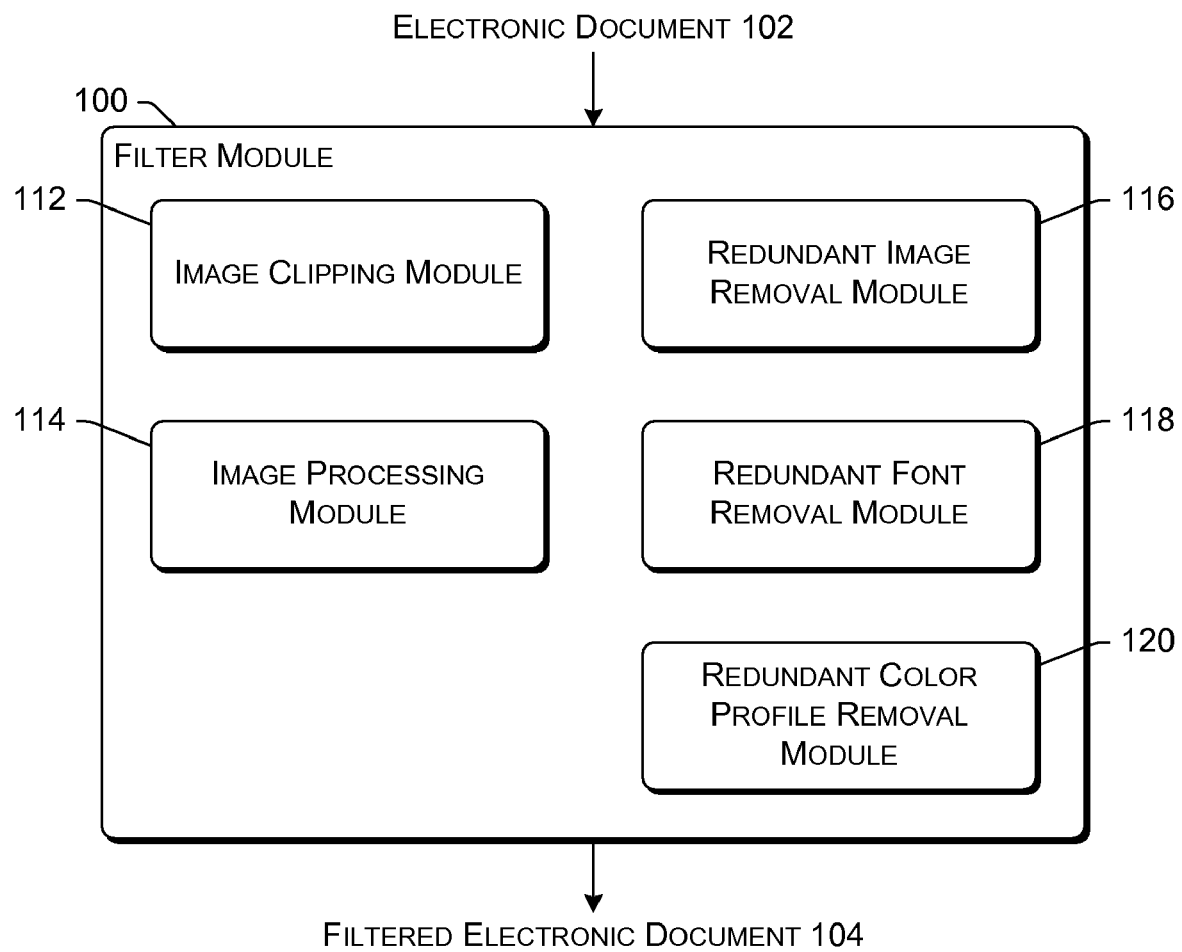
FIG. 1 illustrates an example filter module to remove redundant information from electronic documents.

FIG. 1 illustrates an example filter module 100 to remove redundant information from electronic documents. Filter module 100 obtains an electronic document 102, filters document 102, and generates a filtered electronic document 104. The filtered electronic document 104 is a version of electronic document 102 that has redundant information removed, as discussed in more detail below.

Figure 2:
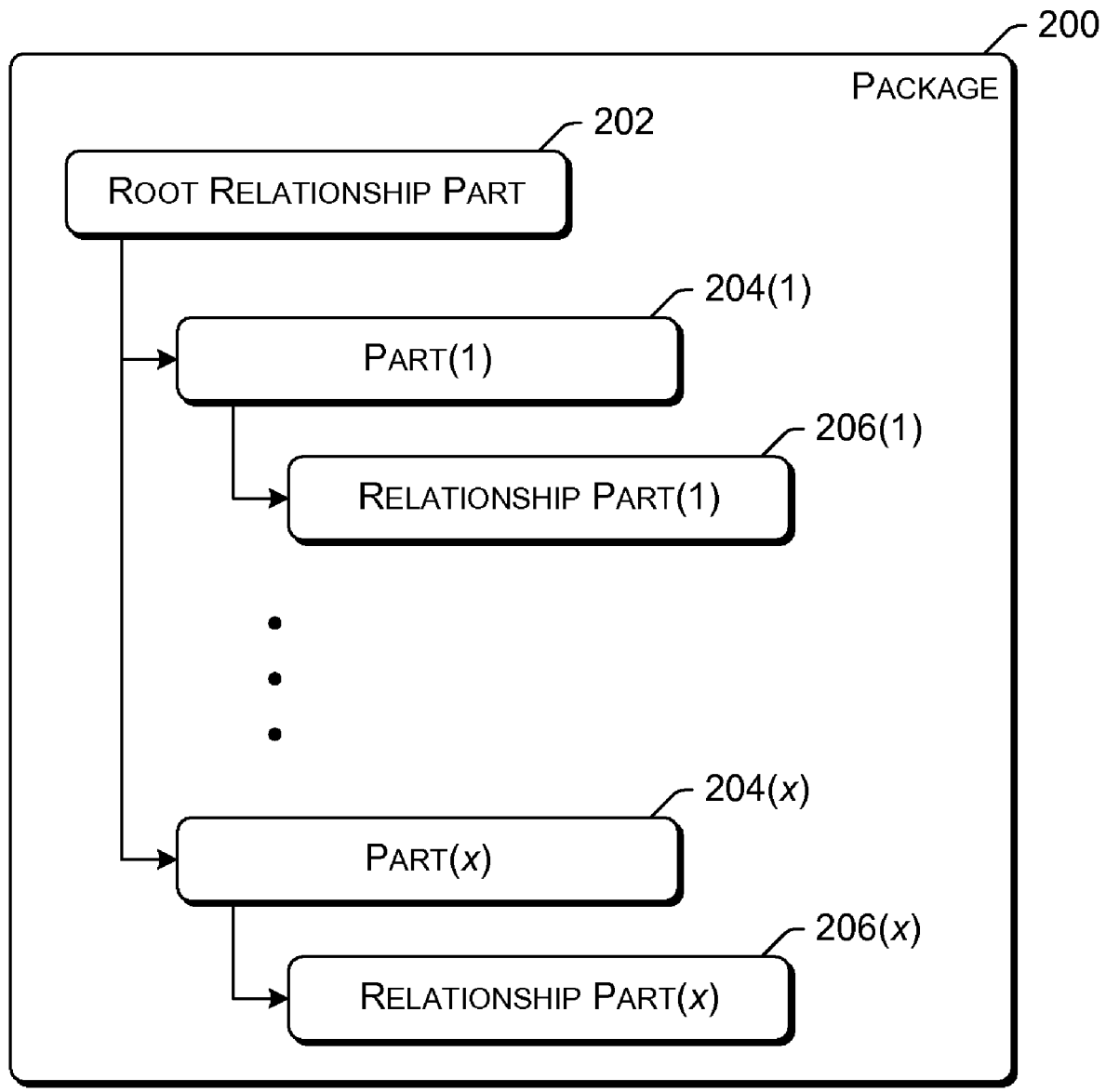
FIG. 2 illustrates an example package for an electronic document.

Electronic documents are stored as packages having multiple parts. FIG. 2 illustrates an example package 200 for an electronic document. Package 200 includes a root relationship part 202, multiple (x) parts 204(1), . . . , 204(x), and multiple (x) relationship parts 206(1), . . . , 206(x). A package refers to the logical entity that holds a collection of one or more parts, and a container refers to a file that represents a package. Typically the container is a single file, although alternatively the container may be made up of multiple files.

Each part 204 and relationship part 206, as well as root relationship part 202, can be stored in different manners. In certain embodiments, each part is a separate file, but is accessed by applications and the operating system through the package 200 rather than individually. For example, if an application desires to display an electronic document, the application does not initially access individual parts 204. Rather, the application initially accesses root relationship part 202 (and optionally one or more relationship parts 206) to identify which one or more parts 204 have the data to create the display for the electronic document, and then accesses the identified parts 204.

Root relationship part 202 identifies all the parts 204 in package 200. Each part 204 is a collection of bytes of the electronic document. Any of a variety of different formats can be used for parts 204, including public and proprietary formats. For example, some parts may be in an eXtensible Markup Language (XML) format, some may be in a HyperText Markup Language (HTML) format, others may be in a proprietary format, and so forth.

Different types of parts 204 can be included. One type of part is typically a payload part, in which most, if not all, of the data of the electronic part is stored (e.g., the words, symbols, characters, etc. of a word processing document; the data, formulas, etc., in the entries of a spreadsheet; the records of a database; the pixel values for an image; and so forth). Other types of parts describe different aspects of the electronic document, such as digital rights management (DRM) techniques employed to protect the electronic document (e.g., specifying user identifiers of others that are permitted to access one or more parts of the electronic document, or a digital certificate that is required by a device or application to access one or more parts of the electronic document, etc.), tracking information for the electronic document, and so forth.

Each part 204 can have associated with it one or more relationship parts 206. Although each part 204 in FIG. 2 is illustrated as having one associated relationship part, alternatively some parts 204 may have no associated relationship parts, and some parts 204 may have two or more associated relationship parts. Each relationship part 206 identifies a part 204 in package 200 or a resource external to package 200. An external resource is a resource that is not part of package 200; the resource may be located on the same computing device as package 200, or alternatively a different computing device. For example, a relationship part 206 associated with a DRM part 204 may identify the parts 204 in package 200 to which the DRM techniques in the DRM part 204 are applied. By way of another example, a relationship part 206 associated with a payload part 204 may identify an image stored at a resource external to package 200 (e.g., a location on a particular server or other computing device) that is to be included as part of the data of the electronic document (e.g., displayed to the user when the electronic document is displayed). The part 204 or external resource identified by the relationship part 206 can be identified in the relationship part 206 in different manners, such as by including in the relationship part 206 a Uniform Resource Identifier (URI) of the part 204 or external resource.

Typically root relationship part 202 does not directly identify all the relationship parts 206, rather root relationship part 202 relies on the parts 204 to identify their respective relationship parts 206. Alternatively, root relationship part 202 may directly identify all the relationship parts 206 as well as the parts 204.

In FIG. 2, root relationship part 202 is illustrated as identifying parts 204, and each part 204 is illustrated as identifying an associated relationship part 206. These identifications can be made in different manners. In certain embodiments, a particular naming convention is followed that allows such identifications to be made. For example, in certain embodiments the naming convention states that the relationship parts 206 are to follow the format "/_rels/*.rels", where the "*" refers to the associated part 204. So, following this example, if a part has the name "/foo.txt", then the associated relationship part 206 would have the name "/_rels/foo.txt.rels" or "/_rels/foo.rels". By way of another example, in certain embodiments the naming convention states that the parts 204 are to follow the format "/*", where the "*" refers to the part 204, so root relationship part 202 can maintain an entry in the format of "/*" for each part in package 200.

Alternatively, the parts and relationship parts 206 may be identified in different manners other than using such naming conventions. For example, root relationship part 202 may include the name (or other unique identifier) of each part 204, and each part 204 may include the name (or other unique identifier) of each associated relationship part 206.

In certain embodiments, package 200 conforms to the Open Packaging Conventions (OPC) specification. Some descriptions of OPC are included herein. Additional information regarding OPC is available as the Ecma Office Open XML File Formats Standard from Ecma® International of Geneva, Switzerland (a current draft can be found on the Internet at "www" followed by "ecma-international.orginews/TC45_current_work/TC45-2006-50_final_draft.htm"). Package 200 can also conform to other proprietary or public standards, such as the XML Paper Specification (XPS). Additional information regarding XPS is available from Microsoft® Corporation of Redmond, Wash.

Following OPC, each part 204 has properties including a name, a content type, and optionally a growth hint. The name property specifies the name of the part. The part names are represented by a logical hierarchy that consists of segments, with the last segment containing the actual content and the preceding segments serving to organize the parts of the package. For example, the part name "/hello/world/doc.xml" includes three segments: "hello", "world", and "doc.xml". The segments "hello" and "world" serve to organize the parts of the package, and the segment "doc.xml" contains the actual content of the part.

The content type property specifies the type of content stored in the part (e.g., payload, DRM, tracking information, etc.). The content type property defines a media type, a subtype, and an optional set of parameters. Content types conform to the definition and syntax for media types as specified in Request for Comments (RFC) 2616—Hypertext Transfer Protocol—HTTP/1.1 (e.g., section 3.7).

The growth hint property is an optional property that specifies a suggested number of bytes to reserve for the part to grow in-place. The growth hint property identifies the number of bytes by which the creator of the part predicts that the part will grow. This information may be used, for example, to reserve space in a mapping to a particular physical format in order to allow the part to grow in-place.

Following OPC, each relationship part 206 represents a relationship between a source part and a target resource (which may be another part in package 200). Relationship parts store relationships using XML. The XML of a relationship part nests one or more <Relationship> elements in a single <Relationships> element. Each <Relationship> element includes a target attribute, an id attribute, a type attribute, and optionally a target mode attribute.

The target attribute is a URI reference pointing to a target resource. The URI reference may be a URI or a relative reference (a reference to another part in the same package as the relationship part). The id attribute is an XML identifier that uniquely identifies the relationship part within the package that includes the relationship part. The id attribute conforms to the W3C Recommendation "XML Schema Part 2: Datatypes".

The type attribute is a URI that uniquely defines the role of the relationship part. The type attribute allows a meaning to be associated with the relationship part. For example, the type attribute may indicate that the relationship part is a hyperlink, or points to a font, or points to an image, and so forth. The target mode attribute indicates whether the target attribute describes a resource inside the package or outside the package. For example, the value "internal" can be used to indicate that the target attribute describes a resource inside the same package as the relationship part, and the value "external" can be used to indicate that the target attribute describes a resource that is not inside the same package as the relationship part.

The container that stores the package maps the root relationship part 202, the parts 204, and the relationship parts 206 to physical package item names. The container can store the package in any of a variety of different manners, and in the OPC specification the container is a ZIP archive file. The ZIP archive file conforms to the well-known ZIP file format specification, but in certain embodiments excludes the elements of the ZIP file format specification that relate to encryption or decryption.

Each package is typically stored as a single ZIP file, although alternatively a package may be stored as multiple ZIP files, or multiple packages may be included in a single ZIP file. A ZIP file includes ZIP items, which are the root relationship part 202, the parts 204, and the relationship parts 206 of package 200.

Returning to FIG. 1, filter module 100 includes an image clipping module 112, an image processing module 114, a redundant image removal module 116, a redundant font removal module 118, and a redundant color profile removal module 120. Image clipping module 112 analyzes images in the electronic document and deletes any portions of those images that would not be displayed when the electronic document is displayed. Image processing module 114 identifies color profile meta data for an image and uses the color profile meta data to generate one or more versions of the image in one or more target color spaces. Redundant image removal module 116 analyzes images in the electronic document, identifies multiple occurrences of the same image, and replaces one or more of those occurrences with a link to the image. Redundant font removal module 118 analyzes fonts in the electronic document, identifies multiple occurrences of the same font, and replaces one or more of those occurrences with a link to the font. Redundant color profile removal module 120 analyzes color profiles in the electronic document, identifies multiple occurrences of the same color profile, and replaces one or more of those occurrences with a link to the color profile. Modules 112-120 are discussed in more detail below.

Although five different modules 112-120 are illustrated in FIG. 1, it is to be appreciated that one or more of modules 112-120 can be combined into a single module, and that in certain embodiments one or more of modules 112-120 are not included in filter module 100. For example, if filter module 100 is not to remove redundant fonts, then redundant font removal module 118 need not be included.

Figure 3:
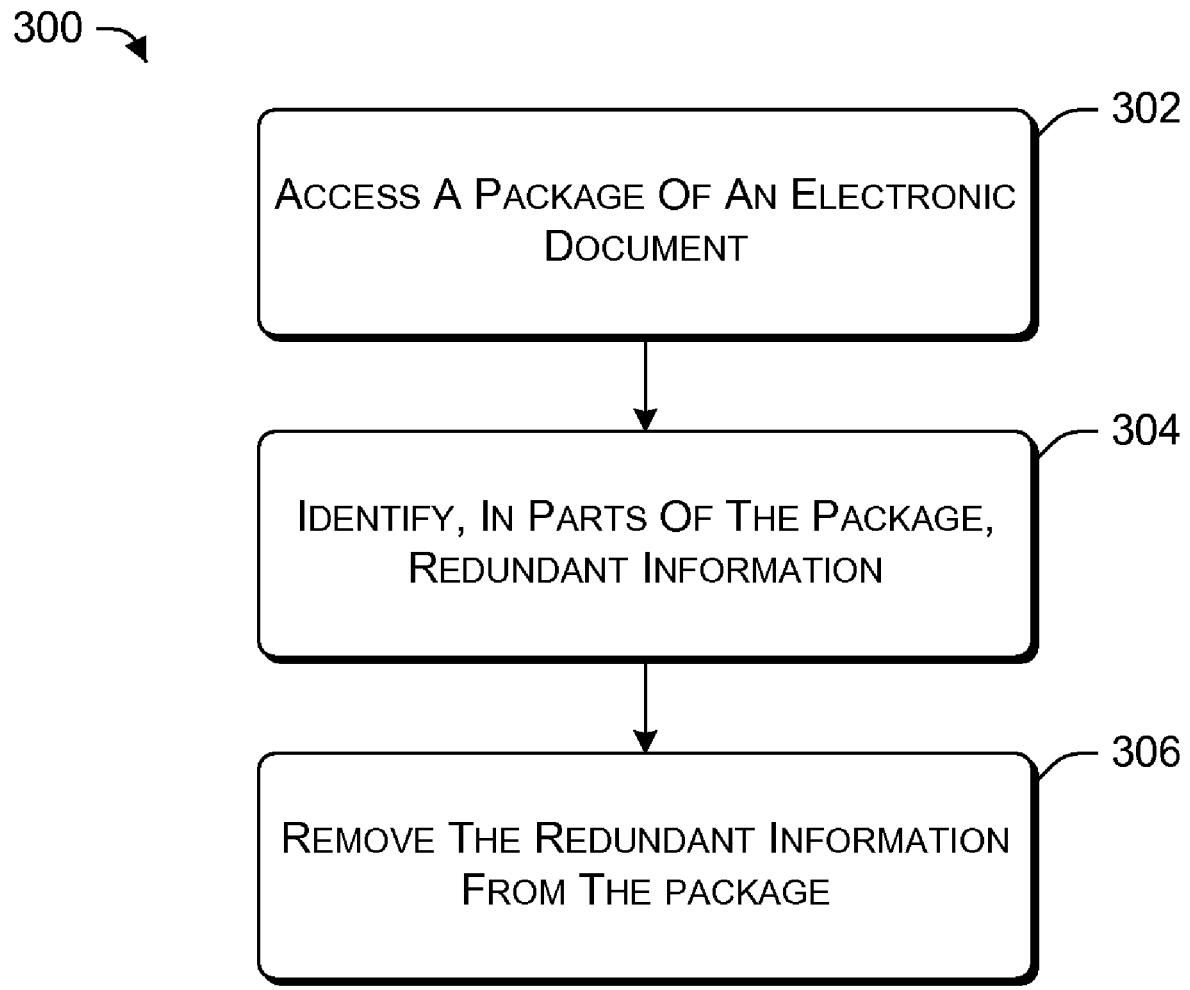
FIG. 3 illustrates an example process for removing redundant information from an electronic document.

FIG. 3 illustrates an example process 300 for removing redundant information from an electronic document. Process 300 can be carried out, for example, by filter module 100, and may be implemented in software, firmware, hardware, or combinations thereof.

Initially, a package of an electronic document is accessed (act 302). The electronic document can be accessed in a variety of different manners. The electronic document may be stored at a known location, an identifier of the electronic document may be passed to filter module 100, the electronic document itself may be passed to filter module 100, and so forth. Redundant information in parts of the package are identified (act 304). Redundant information refers to information that is unnecessary, such as information describing portions of an image that are not displayed when the electronic document is displayed, or information that is color profile meta data for an image that is already transformed to a target color space(s), or information describing the same font, or information describing the same color profile meta data, or information describing the same image, and so forth.

The redundant information as identified in act 304 is removed from the package (act 306). The manner in which the redundant information is removed can vary. For example, one occurrence of the information may be deleted and replaced with a link to another occurrence of the information. By way of another example, portions of an image that are not displayed can be deleted. By way of yet another example, an image may be transformed to a target color space. These various manners of removing redundant information are described in more detail below.

One or more parts of the package can include an image(s). Image clipping module 112 of FIG. 1 analyzes the images in these one or more parts and determines, for each image, whether any portion of the image can be deleted (or clipped). A portion of the image can be deleted or clipped if that portion is not displayed when the electronic document is displayed. A portion of an image may not be displayed when the electronic document is displayed for a variety of reasons. For example, a portion of the image may be outside the visible display area for the electronic document and thus would not be displayed when the electronic document is displayed. By way of another example, a portion of the image may be covered by another image(s) (or text, or any other object(s)) when the electronic document is displayed and thus would not be displayed when the electronic document is displayed.

Portions of an image that cannot be displayed can be identified in different manners. In certain embodiments, the display area for the electronic document is identified and a determination is made, for each image, whether any portion of the image falls outside that display area. The display area for the electronic document refers to the area occupied on a display by the electronic document when the electronic document is displayed to a user. This area is typically defined within the electronic document itself. Various parts of the electronic document are displayed within this display area. Any portion of an image that is not within this display area can be deleted without compromising the integrity of the electronic document because that portion of the image would not be displayed to the user even if it were not deleted.

Additionally, in certain embodiments, the locations of the various images and other parts of the electronic document that are displayed to the user are identified. The order or depth for these images and other parts is also identified by image clipping module 112 so that module 112 can determine which images are covered by which other images or parts. For example, a first image may be located for display in one portion of the electronic document, but a second image may be located so that half of the first image is covered by the second image. The locations and the depths of the images can be analyzed by module 112 and module 112 can determine that the covered half of the first image will not be displayed to the user when the electronic document is displayed to the user. Thus, this covered half of the first image can be deleted without compromising the integrity of the electronic document because that portion of the image would not be displayed to the user even if it were not deleted.

Figure 4:
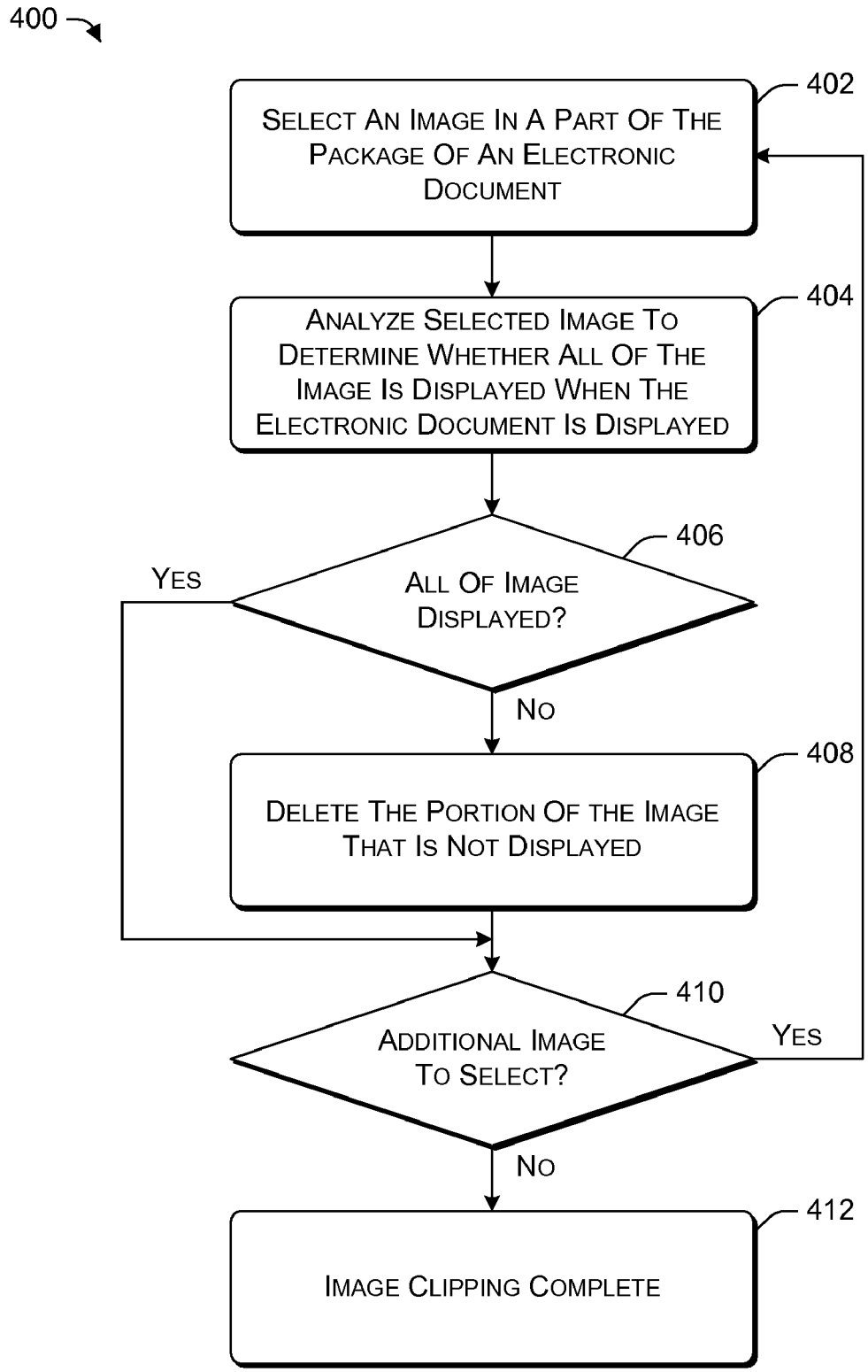
FIG. 4 illustrates an example process for deleting portions of an image in an electronic document.

FIG. 4 illustrates an example process 400 for deleting or clipping portions of an image in an electronic document. Process 400 can be carried out, for example, by image clipping module 112, and may be implemented in software, firmware, hardware, or combinations thereof.

Initially, an image in a part of the package of an electronic document is selected (act 402). The image can be selected in any of a variety of manners, such as randomly, by size (e.g., from smallest to largest or from largest to smallest), based on its location in the package, and so forth. Once selected, the image is analyzed to determine whether all of the image is displayed when the electronic document is displayed (act 404). As discussed above, a portion of an image may not be displayed for a variety of different reasons, such as the portion being outside of the display area for the electronic document, the portion being covered by another image or part of the electronic document, and so forth. Process 400 continues depending on whether all of the image is displayed (act 406).

If all of the image is not displayed, then that portion of the image that is not displayed when the electronic document is displayed is deleted (act 408). After that portion is deleted, or if all of the image is displayed when the electronic document is displayed, a check is made as to whether there are any additional image(s) in the electronic document to select (act 410). If there are one or more additional images to select, then process 400 returns to act 402 to select one of those images, so acts 402-408 are repeated for each image in the electronic document. Alternatively, acts 402-408 may be performed for only some of the images in the package of the electronic document rather than all of the images in the package of the electronic document. When there are no more images to select, process 400 is complete (act 412).

Returning to FIG. 1, image processing module 114 identifies color profile meta data for an image and uses the color profile meta data to generate one or more versions of the image in one or more target color spaces. Different devices can operate in different color spaces, such as RGB (Red Green Blue), CMYK (Cyan Magenta Yellow blacK), sRGB (standard Red Green Blue), and so forth. Each image typically includes color profile meta data that describes the color space that the image is represented in. Each of these different color spaces describes color data for an image, and allows the image to be displayed to a user so that the colors of the image are consistent (e.g., an image being displayed on a monitor has essentially the same colors as the image that was originally scanned in). If the device on which the image will be displayed (or printed, or otherwise presented to the user), referred to as the target device, uses a color space that is different than the device that captured the image, then the image is transformed from the original color space into the color space of the target device. This transformation from one color space to another color space is well-known to those skilled in the art and will not be discussed further except as it pertains to the removal of redundant information from electronic documents discussed herein.

Color profile meta data can be stored in a variety of different manners. In certain embodiments, the color profile meta data is stored as a flag or tag value that is an identifier of the color space. This identifier specifies a particular color space, such as by using a pre-defined mapping (e.g., a value of "1" indicates RGB, a value of "2" indicates CMYK, and so forth). In other embodiments, the color profile meta data describes the color space itself rather than being simply an identifier of a color space. An example of such color profile meta data is an International Color Consortium® (ICC) profile (additional information regarding such profiles is available from the International Color Consortium of Reston, Va. (and can found on the Internet at "www" followed by ".color.org")).

Image processing module 114 uses the color profile meta data to transform the image into one or more target color spaces. This transformation includes generating a new version of the image in the target color space. Color profile meta data for this new version in the target color space is also included as part of (or otherwise associated with) the new version of the image. This new version of the image can be saved as a part of the package of the electronic document, or alternatively may replace the original image. Creating a new image does not delete the original image, and thus does not compromise the integrity of the electronic document. Additionally, replacing the original image with the new version of the image does not compromise the integrity of the electronic document because a version of the image and its color profile meta data is still part of the electronic document.

Figure 5:
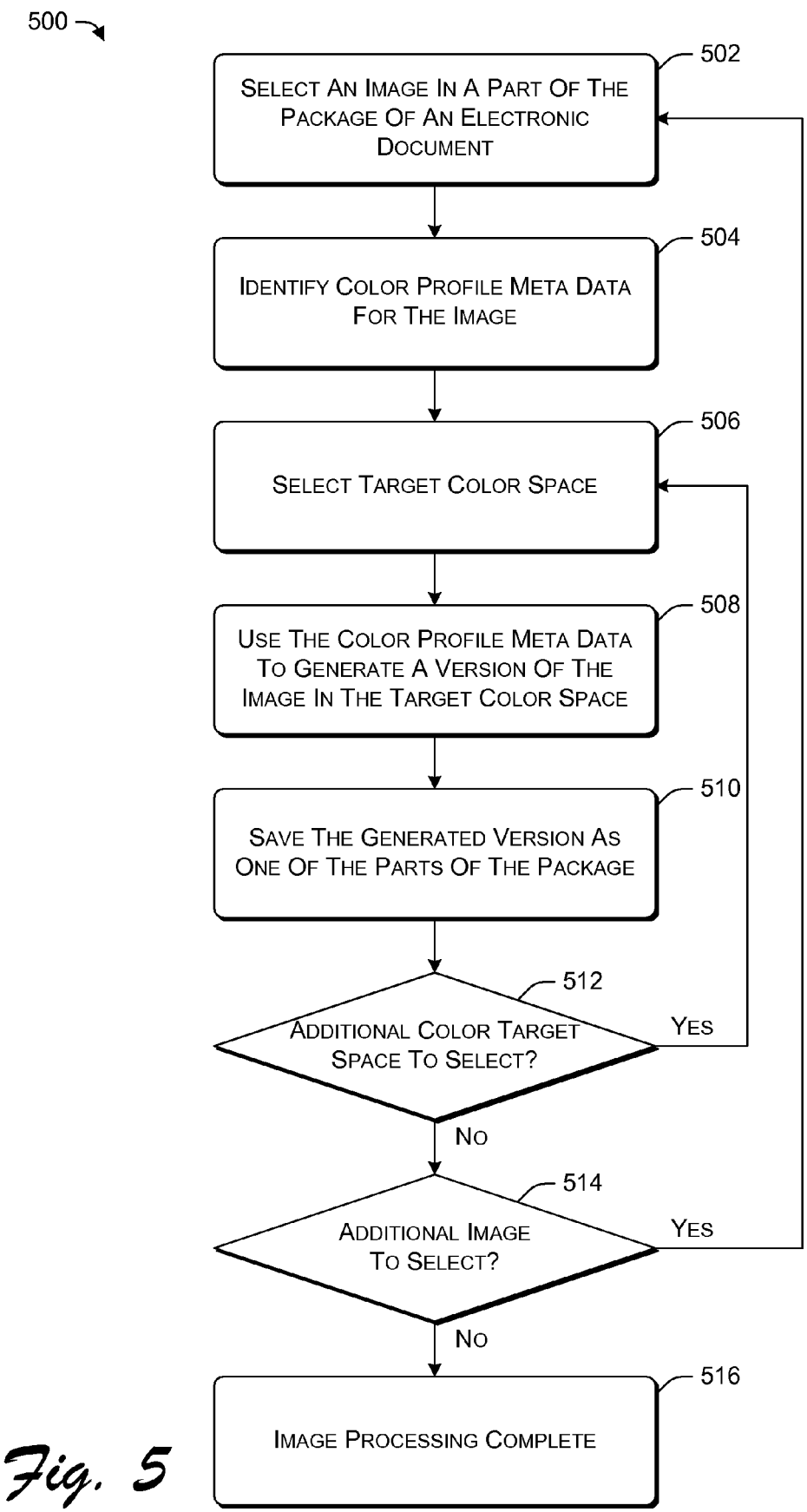
FIG. 5 illustrates an example process for transforming images of an electronic document into one or more target color spaces.

FIG. 5 illustrates an example process 500 for transforming images of an electronic document into one or more target color spaces. Process 500 can be carried out, for example, by image processing module 114, and may be implemented in software, firmware, hardware, or combinations thereof.

Initially, an image in a part of the package of an electronic document is selected (act 502). The image can be selected in any of a variety of manners, such as randomly, by size (e.g., from smallest to largest or from largest to smallest), based on its location in the package, and so forth. Once selected, the color profile meta data for the image is identified (act 504). The color profile meta data is typically included in the data for the image, although the meta data may alternatively be stored elsewhere.

A target color space is also selected (act 506). The target color space can be selected in different manners. For example, image processing module 114 may be programmed with one or more default color spaces, a user or system administrator may identify the target color spaces, and so forth. In certain embodiments, the most commonly used color spaces are selected as the target color spaces in act 506. By selecting the most commonly used color spaces, image processing module 114 is able to pre-process and save images in the most commonly used color spaces. These pre-processed images can be made available to the target devices as part of the electronic document, thereby alleviating the target devices of the need to process the images into the color spaces used by the target devices.

The color profile meta data is then used to generate a version of the image in the selected target color space (act 508). The image is transformed into the selected target color space, and the generated version in the selected target color space is saved as a part of the package of the electronic document (act 510). This generated version is typically a new part of the package, although alternatively the newly generated version could replace the image in the previously selected part (the part selected in act 502). Additionally, after the image has been transformed into all the desired target color spaces, the image in the previously selected part (the part selected in act 502) and its corresponding color profile meta data can optionally be deleted from the package.

A check is then made as to whether there are any additional color target spaces that the image is to be transformed into (act 512). If there are one or more additional color target spaces, then process 500 returns to act 506 and selects one of the target color spaces. If there are not additional color target spaces, then a check is made as to whether there are any additional image(s) in the electronic document to select (act 514). If there are one or more additional images to select, then process 500 returns to act 502 to select one of those images, so acts 502-512 are repeated for each image in the electronic document. Alternatively, acts 502-512 may be performed for only some of the images in the package of the electronic document rather than all of the images in the package of the electronic document. If there are no more additional images to select, then process 500 is complete (act 516).

Returning to FIG. 1, redundant image removal module 116 analyzes images in the electronic document, identifies multiple occurrences of the same image, and replaces one or more of those occurrences with a link to the image. Situations can arise where the same image is stored multiple times within a single package for an electronic document. Redundant image removal module 116 identifies such situations by analyzing the images in the electronic document and determining whether any other occurrences of the same images exist in the electronic document. This comparison of images can be performed in different manners. For example, a byte-by-byte comparison of two images may be performed to determine if corresponding byte values of the images are the same, and if so then the two images are the same. By way of another example, hash values of the two images may be generated first, and a byte-by-byte comparison performed only if the hash values of the two images are the same.

If the images are the same, then one occurrence of the image is kept and the remaining occurrences are replaced with links to the occurrence that is kept. In certain embodiments, these links are stored, for example, as relationship parts (e.g., parts 206) with a link to the other part (e.g., a part 204) having the occurrence that is kept. For example, in FIG. 2, if part 204(1) were the first occurrence and part 204(2) were the second occurrence, then the data for part 204(2) would be deleted, and a relationship part 206(2) associated with part 204(2) would be added, and relationship part 206(2) would include an identifier of part 204(1).

Redundant font removal module 118 analyzes fonts in the electronic document, identifies multiple occurrences of the same font, and replaces one or more of those occurrences with a link to the font. Situations can arise where information describing a particular font (e.g., information describing how that font is to be displayed) is included in the package of the electronic document, and different parts of the electronic document may include this same information describing the font. Redundant font removal module 118 identifies such situations by analyzing the fonts in the electronic document and determining whether any other occurrences of the same font exists in the electronic document. Similar to the image comparison discussed above, this comparison of fonts can be performed in different manners, such as by performing a byte-by-byte comparison of the font descriptions, or by first performing a comparison of hash values of the fonts before performing a byte-by-byte comparison.

If the fonts are the same, then one occurrence of the font is kept and the remaining occurrences are replaced with links to the occurrence that is kept. In certain embodiments, these links are stored, for example, as relationship parts (e.g., parts 206) with a link to the other part (e.g., a part 204) having the occurrence that is kept, analogous to the discussion above regarding images.

Redundant color profile removal module 120 analyzes color profiles in the electronic document, identifies multiple occurrences of the same color profile, and replaces one or more of those occurrences with a link to the color profile. Situations can arise where information describing a particular color profile (the color profile meta data) is included in the package of the electronic document, and different parts of the electronic document may include this same color profile meta data. Redundant color profile removal module 120 identifies such situations by analyzing the color profile meta data in the electronic document and determining whether any other occurrences of the same color profile meta data exists in the electronic document. Similar to the image comparison discussed above, this comparison of color profile meta data can be performed in different manners, such as by performing a byte-by-byte comparison of the color profile meta data, or by first performing a comparison of hash values of the color profile meta data before performing a byte-by-byte comparison.

If the occurrences of the color profile meta data are the same, then one occurrence of the color profile meta data is kept and the remaining occurrences are replaced with links to the occurrence that is kept. In certain embodiments, these links are stored, for example, as relationship parts (e.g., parts 206) with a link to the other part (e.g., a part 204) having the occurrence that is kept, analogous to the discussion above regarding images.

Figure 6:
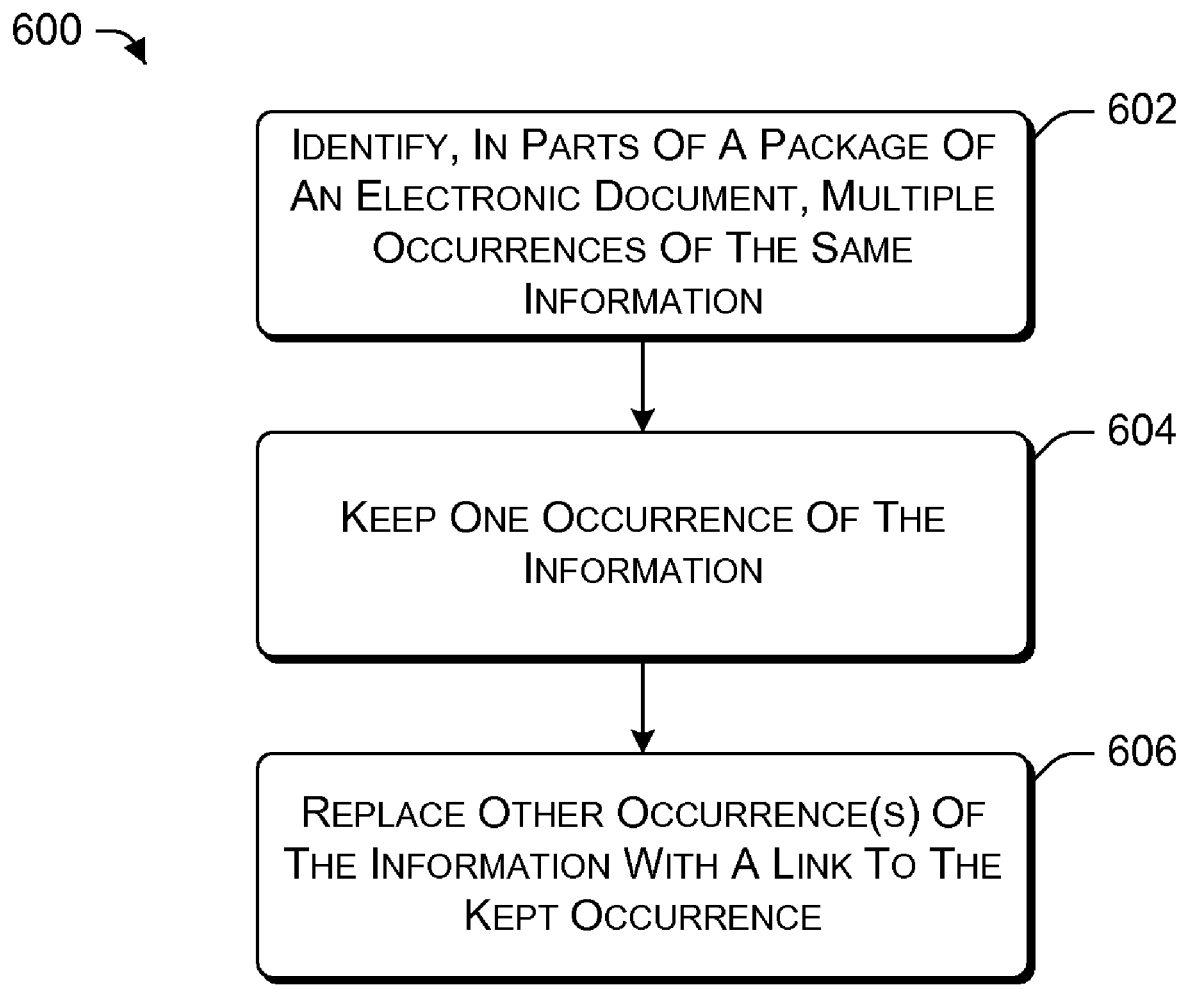
FIG. 6 illustrates an example process for replacing redundant information with a link to another occurrence of the information in an electronic document.

FIG. 6 illustrates an example process 600 for replacing redundant information with a link to another occurrence of the information in an electronic document. Process 600 can be carried out, for example, by redundant image removal module 116, redundant font removal module 118, and/or redundant color profile removal module 120, and may be implemented in software, firmware, hardware, or combinations thereof.

Initially, multiple occurrences of the same information in parts of a package of an electronic document are identified (act 602). This information can be, for example, images, fonts, color profile meta data, and so forth. When multiple occurrences of the same information are identified, one occurrence of the information is kept (act 604) and the other occurrence(s) are replaced with a link to the occurrence that is kept (act 606). Process 600 can be repeated multiple times until all multiple occurrences of information in the package are identified and occurrences are replaced.

The removal of redundant information as discussed above with respect to process 600 deletes occurrences of information but replaces those deleted occurrences with links or references to a remaining occurrence of the same information. Thus, the display of the electronic document remains the same and the integrity of the electronic document is not compromised.

Various other techniques can also optionally be used to remove redundant information from an electronic document. For example, multiple versions of the same resource may be included in an electronic document, such as multiple versions of the same image having different resolutions (e.g., a high resolution and low resolution version), multiple versions of the same image in different formats (e.g., a bitmap version, a TIFF® (tagged image file format) version, a JPEG (Joint Photographic Experts Group) version, and so forth), multiple version of the same font (e.g., a bitmap version and an outline version), and so forth. Redundant information can be removed in such situations in a variety of different manners. In certain embodiments, such redundant information can be removed in a manner analogous to that of transforming images of an electronic document into one or more target color spaces (e.g., the image or font can be transformed to a particular one or more resolutions, versions, and/or formats (one of the current resolutions, versions, and/or formats, or alternatively a new resolution, version, and/or format). In other embodiments, such redundant information can be removed by keeping selected ones of the resolutions, versions, and/or formats kept (e.g., based on those most commonly used or supported, based on known capabilities of a target device(s), etc.).

Additionally, it should be noted that some of the techniques to remove redundant information from an electronic document described herein are lossy, while others are loss-less. A lossy technique is a technique in which some content is lost; the content is deleted and cannot be recovered. A loss-less technique is a technique that removes some data, but in a way that does not result in any actual loss of content. For example, if a portion of an image is removed because it is covered by another image, the removal of that portion is a lossy removal because the content is deleted (although this removal could be viewed as loss-less from the presentation point of view, as there is no removal of content as seen by the user). By way of another example, if an occurrence of an image is removed and replaced by a link to another occurrence of the image, then the removal is loss-less because the content of the image remains in the electronic document.

Figure 7:
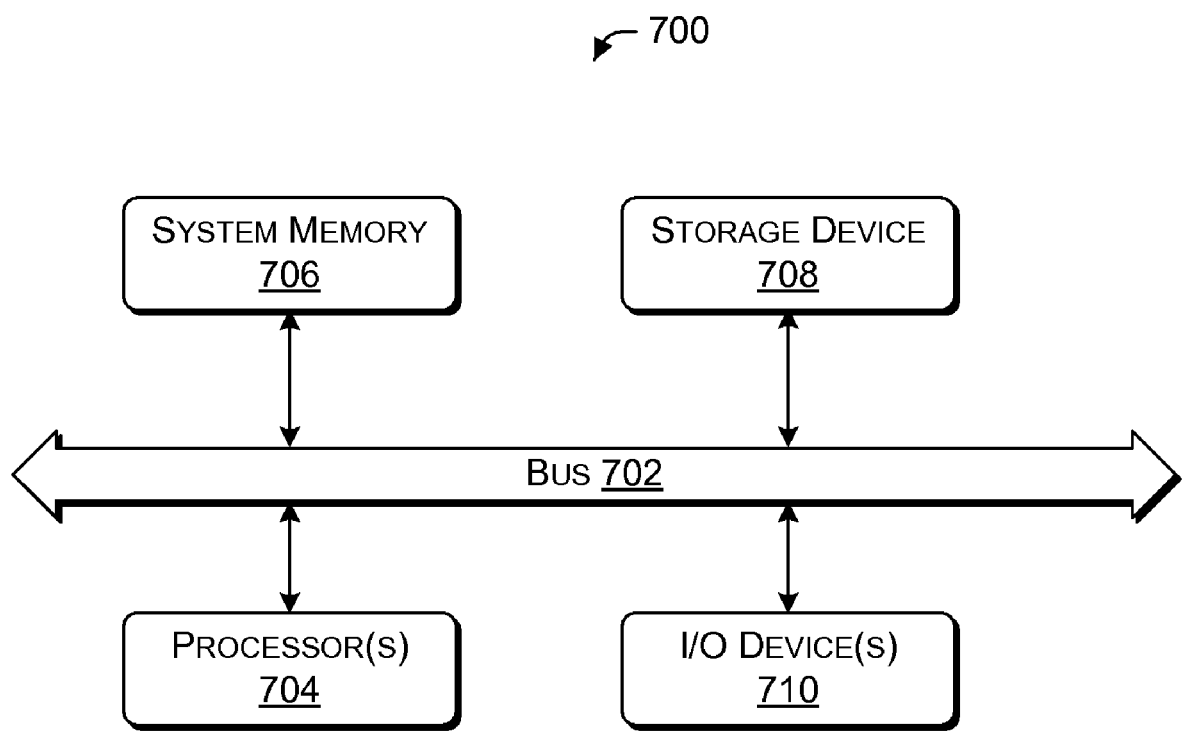
FIG. 7 illustrates an example of a general computing device that can be used to implement the techniques discussed herein.

FIG. 7 illustrates an example of a general computing device 700 that can be used to implement the techniques discussed herein. Computing device 700 can implement, for example, filter module 100 of FIG. 1, and/or any of processes 300, 400, 500, and 600 of FIGS. 3, 4, 5, and 6, respectively. Computing device 700 is only one example of a computing device and is not intended to suggest any limitation as to the scope of use or functionality of the computing device and network architectures. Neither should computing device 700 be interpreted as having any requirement regarding the inclusion (or exclusion) of any components or the coupling or combination of components illustrated in the example computing device 700.

Computing device 700 is a general-purpose computing device that can include, but is not limited to, one or more processors or processing units 704, a system memory 706, and a bus 702 that couples various system components including the processor 704 to the system memory 706.

Bus 702 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

System memory 706 includes computer readable media in the form of volatile memory, such as random access memory (RAM), and/or non-volatile memory, such as read only memory (ROM). System memory 706 can include removable and/or non-removable memory.

Computing device 700 may also include other removable/non-removable, volatile/non-volatile computer storage device 708. By way of example, storage device 708 may be one or more of a hard disk drive for reading from and writing to a non-removable, non-volatile magnetic media, a magnetic disk drive for reading from and writing to a removable, non-volatile magnetic disk (e.g., a "floppy disk"), an optical disk drive for reading from and/or writing to a removable, non-volatile optical disk such as a CD, DVD, or other optical media, a flash memory device, and so forth. These storage device(s) and their associated computer-readable media provide storage of computer readable instructions, data structures, program modules, and/or other data for computing device 700.

User commands and other information can be entered into computing device 700 via one or more input/output (I/O) devices 710, such as a keyboard, a pointing device (e.g., a "mouse"), a microphone, a joystick, a game pad, a satellite dish, a serial port, a universal serial bus (USB), an IEEE 1394 bus, a scanner, a network interface or adapter, a modem, and so forth. Information and data can also be output by computing device 700 via one or more I/O devices 710, such as a monitor, a printer, a network interface or adapter, a modem, a speaker, and so forth.

An implementation of the removal of redundant information from electronic documents described herein may be described in the general context of processor-executable instructions or computer-executable instructions, such as program modules, executed by one or more computing devices. Generally, program modules include routines, programs, objects, components, data structures, etc. that perform particular tasks or implement particular abstract data types. Typically, the functionality of the program modules may be combined or distributed as desired in various embodiments.

An implementation of the removal of redundant information from electronic documents may be stored on or transmitted across some form of computer readable media. Computer readable media or processor-readable media can be any available media that can be accessed by a computer. By way of example, and not limitation, computer readable media or processor readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Alternatively, all or portions of these modules and techniques may be implemented in hardware or a combination of hardware, software, and/or firmware. For example, one or more application specific integrated circuits (ASICs) or programmable logic devices (PLDs) could be designed or programmed to implement one or more portions of the framework.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer readable storage media having stored thereon a plurality of instructions that, when executed by one or more processors, configures the one or more processors to perform operations to generate a filtered electronic document comprising:
   accessing a package for an electronic document, the package including a plurality of parts of the package, wherein each part within the plurality of parts is a separate file that is accessed by an application through the package;
   identifying a display area for the electronic document based at least on known capabilities of one or more target devices;
   determining whether a portion of the electronic document including at least a segment of an image falls outside the display area identified for the one or more target devices;
   identifying redundant information including, within the display area identified, another segment of the image that is covered in the display area by another part of the package; and
   removing, from the package, the identified redundant information, wherein removing the redundant information includes:
      replacing at least one instance of the redundant information in the package for the electronic document with a link to an instance of the redundant information that is maintained; and
   deleting the segment of the image that falls outside the display area identified for the electronic document and the other segment of the image in the display area without compromising visual representation of the electronic document, wherein:
      deleting the other segment of the image in the display area without compromising the visual representation of the electronic document comports with loss-less removal from a presentation point of view due to the other segment being covered by the other part of the package; and
      deleting the other segment of the image in the display area without compromising the visual representation of the electronic document comports with lossy removal from a data recovery point of view.

2. One or more computer readable storage media as recited in claim 1, wherein identifying the redundant information is further to identify a first occurrence of additional information in the package and a second occurrence of the additional information in the package, and wherein to remove the redundant information is further to replace the second occurrence of the additional information with a link to the first occurrence of the additional information in the package.

3. One or more computer readable storage media as recited in claim 2, wherein replacing the second occurrence of the additional information is to delete the second occurrence of the additional information and add a relationship part to the package, the relationship part referencing a part of the plurality of parts of the package that includes the first occurrence of the additional information.

4. One or more computer readable storage media as recited in claim 2, wherein the additional information comprises a second image.

5. One or more computer readable storage media as recited in claim 2, wherein the additional information comprises a font.

6. One or more computer readable storage media as recited in claim 2, wherein the additional information comprises color profile meta data.

7. One or more computer readable storage media as recited in claim 1, wherein identifying the redundant information is further to identify color profile meta data, and wherein to remove the redundant information is further to process the image using the color profile meta data to generate a version of the image in one or more target color spaces.

8. One or more computer readable storage media as recited in claim 1, wherein the plurality of parts of the package comprises: a root relationship part, at least one relationship part, and at least one payload part, wherein the root relationship part identifies parts in the package, and wherein the at least one relationship part is associated with the at least one payload part and identifies an image stored at a resource external to the package.

9. One or more computer readable storage media as recited in claim 1, further comprising:
identifying the redundant information in the package for the electronic document by performing at least one of a byte-by-byte comparison or a hash value comparison.

10. One or more computer readable storage media as recited in claim 1, further comprising storing a link to at least one part of the plurality of parts as a relationship part such that data for the part being linked is deleted and the relationship part is added.

11. One or more computer readable storage media as recited in claim 1, the operations further comprising providing the filtered electronic document to an output device for display.

12. A method for generating a filtered electronic document comprising:
accessing a package for an electronic document, the package including a plurality of parts, wherein each part within the plurality of parts is a separate file that is accessed by an application and an operating system through the package;
identifying a display area for the electronic document based at least on known capabilities of one or more target devices;
determining whether an image is included, at least in part, in a portion of the electronic document that falls outside the display area being identified for the one or more target devices, the image being in a first part of the plurality of parts of the package;
identifying color profile meta data for the image;
using the color profile meta data to generate a version of the image in a target color space;
saving, on a computer readable storage medium, the generated version of the image as a second part of the plurality of parts of the package;
identifying redundant information that will not be displayed when the electronic document is displayed, the redundant information including:
the image from the first part of the plurality of parts of the package and that is included, at least in part, in the portion of the electronic document that falls outside the display area being identified;
at least a portion of the generated version of the image in the second part of the plurality of parts of the package that is outside of a visible display area for the electronic document; and
at least a portion of the generated version of the image in the second part of the plurality of parts of the package that is within the visible display area for the electronic document; and
removing, from the package, without compromising visual representation of the electronic document, some of the identified redundant information, wherein removing some of the identified redundant information includes:
providing a link from the first part to the second part of the plurality of parts of the package;
deleting the image from the first part of the plurality of parts of the package when the generated version of the image has been saved as the second part of the plurality of parts of the package;
deleting, from the second part of the plurality of parts, the portion of the generated version of the image that is outside of the visible display area of the electronic document;
when the portion of the generated version of the image from the second part of the plurality of parts of the package that is within the visible display area for the electronic document will be covered by an object from another part of the electronic document when the electronic document is displayed, deleting the portion of the generated version of the image that will be covered; and
wherein the providing the link from the first part to the second part of the plurality of parts of the package and the deleting the image from the first part of the plurality of parts together represent loss-less removal of content of the image due at least to the provision of the link, the loss-less removal being a technique that removes some data in a way that does not result in loss of content.

13. A method as recited in claim 12, the method further comprising:
repeating the using and saving before the removing to generate one or more additional versions of the image in one or more additional target color spaces.

14. A method as recited in claim 12, wherein the deleting the part of the generated version of the image that falls outside the display area from the second part of the plurality of parts and the portion of the generated version of the image from the second part of the plurality of parts that is covered represent lossy removal from a data recovery point of view and loss-less removal from a presentation point of view, lossy removal being a technique in which some content is lost, the lost content is deleted and cannot be recovered and loss-less removal being a technique that removes some data in a way that does not result in loss of content.

15. A method as recited in claim 12, further comprising providing the filtered electronic document to an output device for display.

16. An apparatus comprising:
a processor;
a memory operatively coupled to the processor, the memory having encoded thereon processor-executable instructions for performing operations to generate a filtered electronic document including:
  accessing a package for an electronic document, the package including a plurality of parts of the package, wherein:
    each part within the plurality of parts is a separate file that is accessed by an application and an operating system through the package; and
    an image is stored in a first part of the plurality of parts of the package for the electronic document;
  identifying a display area for the electronic document based at least on known capabilities of one or more target devices;
  determining whether a portion of the image falls outside the display area being identified for the electronic document for the one or more target devices;
  identifying a portion of the image that falls inside the display area being identified;
  identifying color profile meta data for the image;
  using the color profile meta data to generate a version of the image in a target color space;
  saving the generated version of the image as a second part of the plurality of parts of the package;
  identifying redundant information that will not be displayed when the electronic document is displayed, the redundant information being identified including:
    the portion of the image that is outside of the display area identified for the electronic document; and
    a segment of the electronic document stored in one part of a plurality of parts that will not be visible in the display area being identified for the electronic document, the segment including:
      the portion of the image that will fall inside the display area being identified for the electronic document; and
      a covered portion of the generated version of the image stored in the second part of the plurality of parts of the package that will fall inside the display area being identified for the electronic document and will be covered by an object from a third part of the plurality of parts of the package when the electronic document is displayed; and
  removing, from the package, without compromising visual representation of the electronic document, the identified redundant information, wherein removing the identified redundant information includes:
    deleting the image from the first part of the plurality of parts of the package;
    storing a link from the first part to the second part of the plurality of parts of the package as a relationship part such that the relationship part of the plurality of parts of the package is added; and
    deleting the covered portion of the generated version of the image.

17. An apparatus as recited in claim 16, wherein the deleting the image from the first part of the plurality of parts of the package and adding a link from the first part to the second part of the plurality of parts of the package comprises loss-less removal of content of the image due at least to the addition of the link, loss-less removal being a technique that removes some data in a way that does not result in loss of content.

18. An apparatus as recited in claim 16, wherein the deleting the covered portion of the generated version of the image is comprised of lossy removal such that the covered portion being deleted is not recoverable.

19. An apparatus as recited in claim 16, the processor-executable instructions for performing operations further including instructions for providing the filtered electronic document to an output device for display.

* * * * *